United States Patent [19]
Morgan

[11] Patent Number: 5,950,652
[45] Date of Patent: Sep. 14, 1999

[54] LOAD BALANCED PRESSURE REGULATOR AND METHOD AND APPARATUS FOR DELIVERING PROCESS GAS FOR MANUFACTURING SEMICONDUCTOR DEVICES EMPLOYING SAME

[75] Inventor: Daniel P. Morgan, Benicia, Calif.

[73] Assignee: Parker Hannifin Corporation, Richmond, Calif.

[21] Appl. No.: 09/021,865

[22] Filed: Feb. 11, 1998

[51] Int. Cl.⁶ .................................................. G05D 16/02
[52] U.S. Cl. ...................... 137/14; 137/505; 137/505.41; 251/337
[58] Field of Search .............................. 137/505, 505.41, 137/505.39, 14; 251/337, 64

[56] References Cited

U.S. PATENT DOCUMENTS

| | | | |
|---|---|---|---|
| 2,190,464 | 2/1940 | Wile | 251/64 X |
| 2,573,522 | 10/1951 | Watt | 251/64 X |
| 2,768,643 | 10/1956 | Acomb | 251/64 X |
| 2,827,077 | 3/1958 | Mitchell | 251/64 X |

Primary Examiner—Stephen M. Hepperle
Attorney, Agent, or Firm—Antonelli, Terry, Stout & Kraus, LLP

[57] ABSTRACT

The transient response of a tied diaphragm gas pressure regulator is improved by reducing breakaway friction of a regulator valve with respect to its cooperating valve seat. This is preferably achieved by reducing the lateral load of the valve against the valve seat while the regulator is in a functional mode. In a disclosed embodiment an asymmetrical compression spring applies a force asymmetrically with respect to the axis of the valve. A tool permits adjusting the asymmetry of this force for counterbalancing existing lateral forces on the valve. As a result, overshoot of the gas pressure of the regulator with respect to a set outlet pressure at the onset of flow through the regulator can be substantially reduced or eliminated. The time necessary for providing a stable outlet pressure with the regulator after the onset of flow can also be significantly reduced. A disclosed method and apparatus for delivering a process gas for the manufacture of semiconductor devices advantageously utilize the improved load balanced pressure regulator for more consistent results in the application of materials or elements from the gas to the wafers.

17 Claims, 4 Drawing Sheets

LOAD BALANCED PRESSURE REGULATOR AND METHOD AND APPARATUS FOR DELIVERING PROCESS GAS FOR MANUFACTURING SEMICONDUCTOR DEVICES EMPLOYING SAME

SPECIFICATION

1. Field of the Invention

The present invention relates to an improved gas pressure regulator particularly useful for regulating the flow of a pressurized process gas used in the manufacture of semiconductor devices, and to a method and apparatus employing the same.

2. Background and Summary of the Invention

The manufacture of semiconductor devices involves the deposition of materials from a gas onto a substrate, typically silicon. Precise control of the pressure and flow rate of these process gases is critical to maintain consistency in the deposition process. As the technology of semiconductor manufacture matures, the need has been recognized for gas delivery systems that will respond to a sudden change in the flow rate in a smooth manner without producing "spikes" in the gas flow that can slow the fabrication process and ultimately lead to inconsistent results in the application of materials or elements from the gas to the wafer. The nature in which a regulator responds to step changes in the flow is referred to as "transient response".

One source of inconsistency in the delivery of gas to the silicon wafers occurs just at the onset of gas flow. A regulator is used to establish a consistent pressure so that a flow control device can maintain a consistent flow. As the flow is initiated, however, the pressure delivered by the regulator will overshoot the set value and then bounce back toward it. This overshoot is caused by the breakaway friction of the valve with respect to the valve seat which causes the valve or poppet to stroke beyond the position required to maintain the proper outlet pressure thereby resulting in a pressure spike. Conventional methods of reducing breakaway friction, such as using lubricants, are not acceptable in these applications due to the corrosive nature of the gases being delivered and the extremely tight purity requirements.

An object of the present invention is to provide an improved gas pressure regulator that reduces or eliminates the aforementioned problem of breakaway friction without the use of lubricants. A further object of the present invention is to provide a gas pressure regulator having an improved transient response such that a stable outlet pressure with little or no overshoot can be provided at the onset of flow. Another object of the invention is to provide an improved gas pressure regulator which provides a stable outlet pressure within a shorter period of time after the onset of flow as compared with conventional gas pressure regulators.

These and other objects are attained by the improved gas pressure regulator of the invention by providing the regulator with means for reducing the transient response of the regulator at the onset of flow through the regulator, the means for reducing being externally adjustable with the regulator in a functional mode for minimizing the transient response of the regulator in operation. Preferably, the means for reducing the transient response of the regulator reduces the magnitude of the overshoot of the outlet gas pressure of the regulator with respect to a set outlet pressure at the onset of flow through the regulator and also reduces the duration or time of the transient response of the regulator at the onset of flow through the regulator.

In a disclosed, preferred embodiment of the gas pressure regulator of the invention, the means for applying an adjustable force to the diaphragm and poppet for setting a desired outlet gas pressure of the regulator in accordance with the balance of forces thereon including force from the pressurized gas and the adjustable force from the means for applying, applies a force to the assembly of the diaphragm and poppet asymmetrically with respect to the axis of the poppet. The means for reducing the transient response of the regulator includes a tool or member for externally, manually adjusting the asymmetry of the adjustable force applied to the diaphragm and poppet by the means for applying with the regulator in a functional mode of the regulator.

The means for applying an asymmetrical force to the diaphragm and valve is preferably an asymmetric compression spring. The end of the compression spring adjacent the diaphragm, in the relaxed state of the spring, is made non-normal relative to a central, longitudinal axis of the spring such that the spring acts as a cam which provides a load on the diaphragm and valve offset from the axis of the spring and the axis of the poppet. The tool for adjusting the asymmetry of the adjustable force applied to the diaphragm and valve is rotated to rotate the spring about the axis thereof in the regulator while the regulator is in a functional mode.

Means are provided for preventing rotation of the spring about the central longitudinal axis thereof in the regulator in the absence of actuation of the tool. This means for preventing rotation is preferably in the form of a magnetic washer stationarily mounted in the regulator for securing a set rotational position of the spring about its axis.

An apparatus of the invention for delivering a process gas for the manufacture of semiconductor devices comprises a source of a pressurized process gas for the manufacture of semiconductor devices, a flow line from the source for delivering the process gas for the manufacture of semiconductor devices, and a gas pressure regulator of the invention in the flow line for regulating the pressure of the pressurized gas being delivered by the apparatus.

A method of the invention of improving the performance of a tied diaphragm gas pressure regulator according to the invention, wherein the regulator comprises a gas passage therethrough, a valve, a valve seat arranged for opening and closing the gas pressure, a poppet carrying one of the valve and valve seat and being movable along an axis thereof for effecting relative movement between the valve and the valve seat for opening and closing the gas passage, and a diaphragm mounted in the reguluator for movement, the poppet being connected to the diaphragm for movement therewith along the axis, said method applying force to the diaphragm and poppet which is asymmetrical with respect to the axis of the poppet, and adjusting the asymmetry of the force while the regulator is in a functional mode to reduce the lateral force between the valve and the valve seat when the gas passage is closed by the valve and valve seat.

These and other objects, features and advantages of the present invention will become more apparent when taken in connection with the accompanying drawings, showing a preferred embodiment of the invention, and the following detailed description of the invention.

DETAILED DESCRIPTION OF THE DISCLOSED EMBODIMENT

Figure 1:
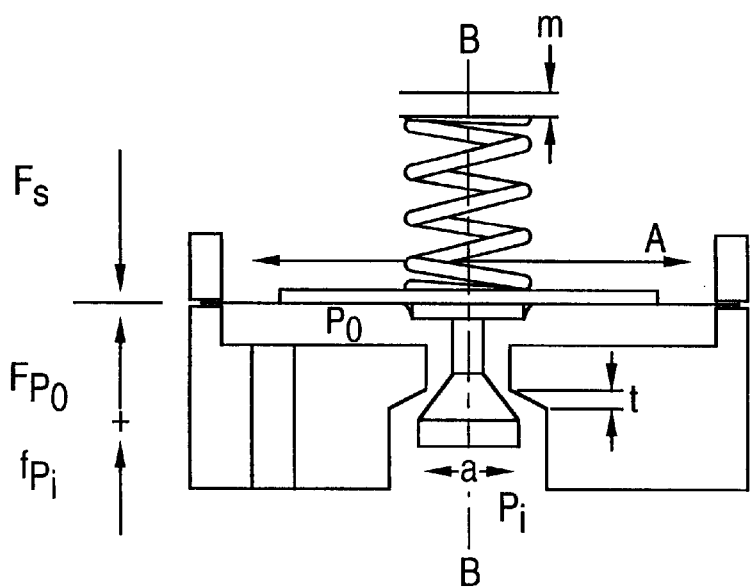
FIG. 1 is a schematic diagram of a gas pressure regulator operating by maintaining a load balance of the forces required to open or close a valve of the regulator, the forces shown acting in the axial direction B—B, that is, in the direction to open or close the valve.
Figure 3:
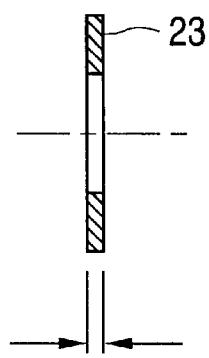
FIG. 3 is a cross-sectional view of the magnetic washer of FIG. 2 taken along the line III—III therein.
Figure 2:
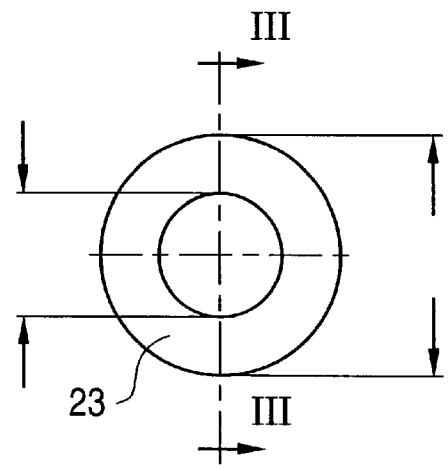
FIG. 2 is an enlarged, top plan view of a magnetic washer of the gas pressure regulator of a disclosed embodiment of the invention as depicted in FIG. 5.

Referring now to the drawings, particularly FIGS. 2–5, a gas pressure regulator 1 of the invention comprises an inlet 2, an outlet 3, and a gas passage 4 extending through the regulator between the inlet and the outlet for the flow of pressurized gas through the regulator. The gas passage 4 extends through a valve seat 5 of the regulator. A poppet having a valve 6 at one end thereof is movable along an axis thereof, B—B in FIG. 5, relative to the valve seat 5 for opening and closing the gas passage 4.

A flexible metal diaphragm 7 is mounted in the regulator for movement relative to the valve seat 5. The poppet/valve 6 is connected to the diaphragm for movement therewith. A compression spring 8 applies an adjustable force to the diaphragm and poppet assembly for setting a desired outlet gas pressure of the regulator in accordance with the balance of forces thereon including force from the pressurized gas in the regulator acting upon the valve 6 and diaphragm 7 in a first direction and the adjustable force from the compression spring 8 acting in an opposite direction. The compression spring 8 can be adjustably compressed by means of adjustment knob 9 which is threadedly received within a threaded opening in the upper end of regulator casing 10. A threaded lock nut 11 engages the outer periphery of the adjustment knob 9 for fixing a set load on the compression spring 8 and the corresponding outlet pressure of the regulator when lock nut 11 is turned to engage the upper end of the regulator casing. A return spring 12 is positioned between a stationary backup plate 13 and a spring retainer 14 connected to the diaphragm and poppet assembly for movement therewith back and forth along the axial direction B—B thereof. The spring 12 biases the poppet in a direction for closing the passage through the valve seat in the regulator.

Figure 4:
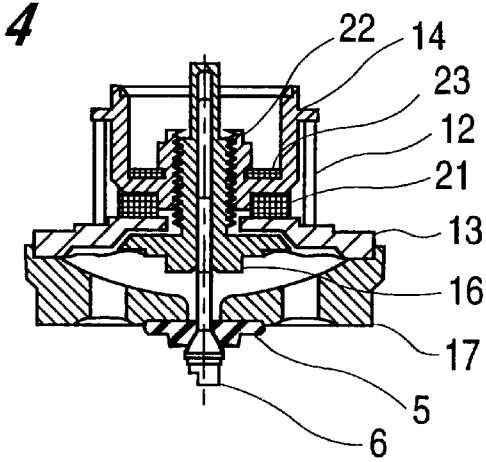
FIG. 4 is a cross-sectional view along the longitudinal center line of the valve-diaphragm assembly of the regulator of FIG. 5.
Figure 5:
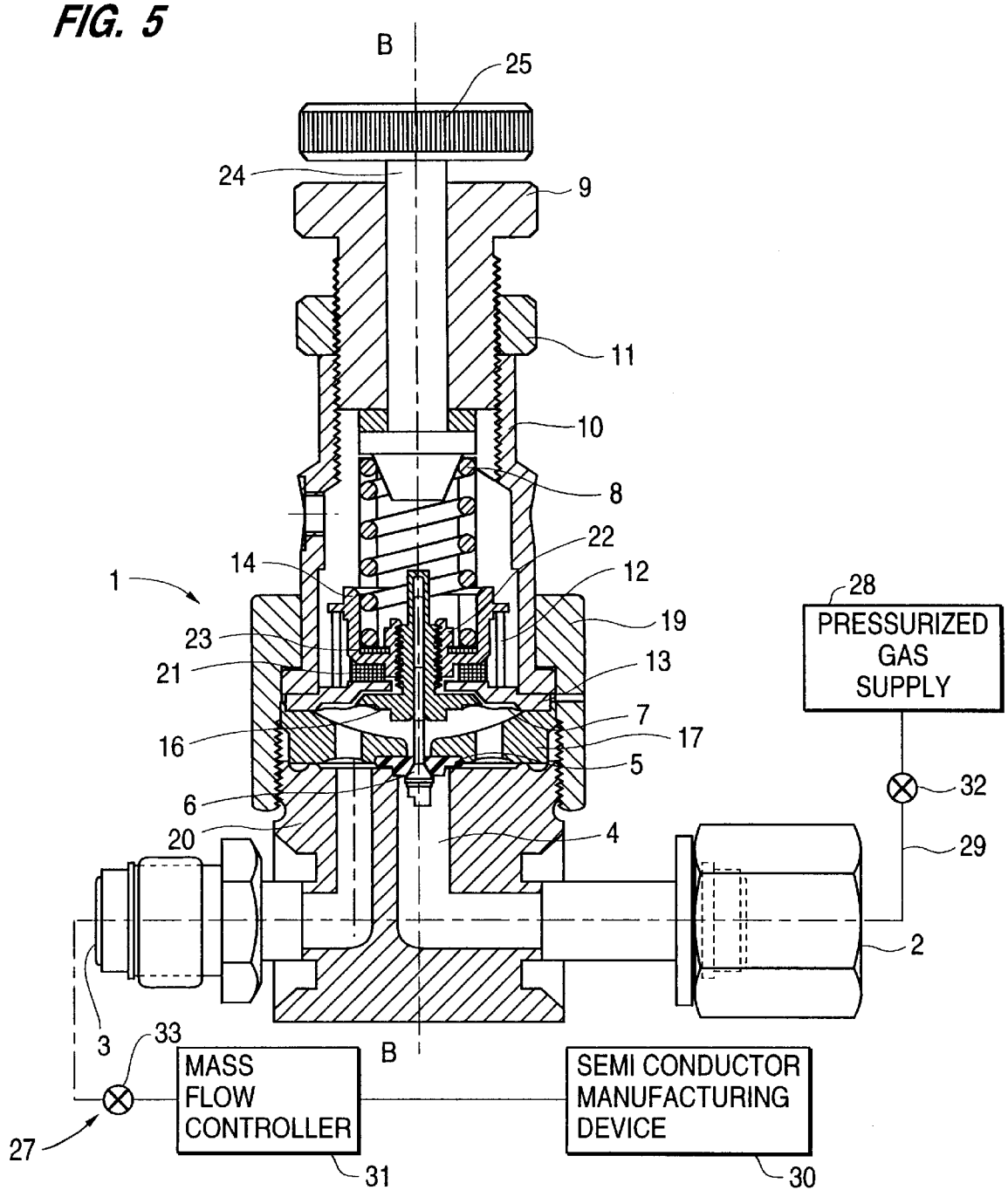
FIG. 5 is a side elevational view, partially in cross-section, through the longitudinal central axis B—B of the regulator and the valve-diaphragm assembly thereof according to the invention with the regulator being shown in a schematically illustrated apparatus of the invention for delivering a process gas for the manufacture of semiconductor devices.

The flexible metal diaphragm 7 is welded to a central diaphragm plate 16 to form the diaphragm assembly. The outer periphery of the flexible metal diaphragm 7 is sealingly clamped between plate 17 of the regulator and backup plate 13 by the upper casing 10 and lower body 20 of the regulator which are connected by threaded fastener 19 as depicted in FIG. 5. The poppet/valve 6 is connected to the diaphragm assembly by way of the upper stem thereof which is secured in a central, axially directed aperture of the central plate 16 as by crimping and/or a threaded connection as shown in FIGS. 4 and 5.

A foam washer 21 is positioned between the retainer 14 and the radially inner, upper side of backup plate 13 for damping high frequency regulator vibration induced by vortex shedding as shown and described in more detail in commonly assigned, co-pending U.S. patent application Ser. No. 09/021,823 filed Feb. 11, 1998 entitled Articulating Poppet Gas Pressure Regulator with Reduced Hysterisis, filed concurrently with the subject application and hereby incorporated by reference.

The retainer 14 is threadedly secured on the outer periphery of a central, upwardly extending portion of the central diaphragm plate 16. A nut 22 is also threadedly connected on this same portion of the plate 16. The nut 22 axially clamps the inner periphery of the magnetic washer 23 against the retainer 14 to prevent its rotation. The lower end of compression spring 8 contacts the washer 23 and is magnetically attracted thereto to rotationally fix the position thereof as noted previously.

The gas pressure regulator 1 of the invention is a tied diaphragm gas pressure regulator which operates by maintaining a balance of forces required to open or close the valve 6. This force balancing is generally, schematically shown in FIG. 1 wherein:

m=deflection of the spring

A=effective area of the diaphragm t=travel of the valve a=effective area of the orifice $P_i$=inlet pressure, and $P_o$=outlet pressure.

The spring force $F_s$, the outlet pressure force $FP_o$ and the inlet pressure force FPi are defined by the following equations:

spring force $F_s = K \times m$ outlet pressure force: $FP_o = P \times A$ inlet pressure force: $fPi = (P_1 - P_o) \times a$ A summation of forces yields the following equation:

$F_o = P_o \times A + (P_1 - P_o) \times a.$

Solving for the outlet pressure, $$P_o = \frac{F_s}{A} - (P_i - P_o) \times \frac{a}{A}$$

Typically a/A=1/200 such that there is a supply pressure effect of 0.5 psi increase in outlet pressure for every 100 psi decease in supply pressure. The travel t of the valve to change flow is defined by:

$$t = \Delta P_o \times A \qquad K_s = \text{ spring rate of system}$$

$$\text{(spring = diaphragm)}$$

Flow capacity is determined by the travel t of the valve and the area of a flow passage.

It is noted that all the forces shown in FIG. 1 are acting in the axial direction B—B, that is, in the direction to open or close the valve 6. Forces which act laterally to the axis of the valve have in the past always been ignored. However, it has been found that in low flow applications, less than one liter per minute, these forces become significant because the friction between the poppet and the seat is a function of these lateral forces. Most semiconductor processes take place at these low flow rates. The lateral forces in a pressure regulator are caused by several things including:

offset of the poppet relative to the seat, (multiplied by the lateral spring rate of the assembly);

asymmetry of the load provided by the range spring;

asymmetry of the load provided by the bias spring (poppet spring); and asymmetry of the load provided by the diaphragm.

These asymmetric loads will add to provide a net moment of the poppet around the focus of the diaphragm/poppet assembly resulting in a lateral load of the poppet against the seat. According to the present invention. this lateral load is reduced or eliminated so that the regulator can respond to the changes in the demand of flow without overshoot or with much reduced overshoot.

More particularly, according to the preferred embodiment of the invention, the compression spring 8 is an asymmetric compression spring which, when used in conjunction with the magnetic locating washer 23, provides a means to apply an asymmetric load to offset the other asymmetric loads inherent in the pressure regulator. By reducing the lateral load of the poppet against the seat, the breakaway friction can be reduced to the point that overshoot of the outlet pressure is reduced to a level that will have no impact on the flow control device. The precise location of the asymmetric load required to counterbalance the system is determined analogously by monitoring the outlet pressure as the asymmetric load spring is adjusted, e.g. rotated by means of the externally accessible knob 25 of tool 24, with the regulator in operation.

Figure 9:
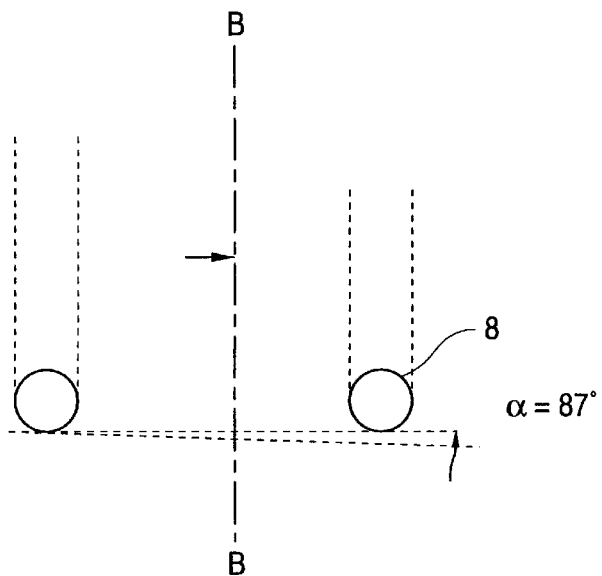
FIG. 9 is a schematic illustration of the lower end of the relaxed, asymmetric compression spring of the regulator of FIG. 5, the bottom of the spring being ground at a non-normal angle α relative to the axis B—B of the spring.

The bottom of the compression spring 8, in its relaxed state is ground at an angle α of 87° relative to the axis B—B of the spring as illustrated in FIG. 9. This causes the bottom of the spring, when compressed in the regulator, to act as a cam which will provide a load on the diaphragm and poppet assembly which is offset from the central longitudinal axis of the spring and the axis B—B of the diaphragm and poppet assembly. According to the invention, this load is positioned to directly oppose the other moment in the system such that the net moment, and thereby the net lateral load of the poppet against the seat, is reduced or eliminated. The magnetic locating washer 23 at the base of the asymmetric loading spring 8 enables the spring to be positioned while the regulator is in a functioning mode through the use of rotatable tool 24, which is connected to the upper end of the spring 8 as by welding as depicted in FIG. 5.

Rotation of the external knob 25 on the upper end of tool 24 rotates the internal asymmetric compression spring 8 relative to the valve-diaphragm assembly as noted above. This external adjustment of the rotational position of the compression spring can be made while the regulator is in a functioning mode and, by way of the magnetic locating washer 23 the adjusted location or position of the spring 8 can be maintained once the proper position has been established. This ensures that the performance will not degrade later due to the shifting of the spring which would change the load balance. The rotation of knob 25 is performed manually by the operator in the disclosed embodiment but it could be automated with feedback signals during initial operation of the regulator, and/or periodically during operation for improving regulator performance.

Figure 6:
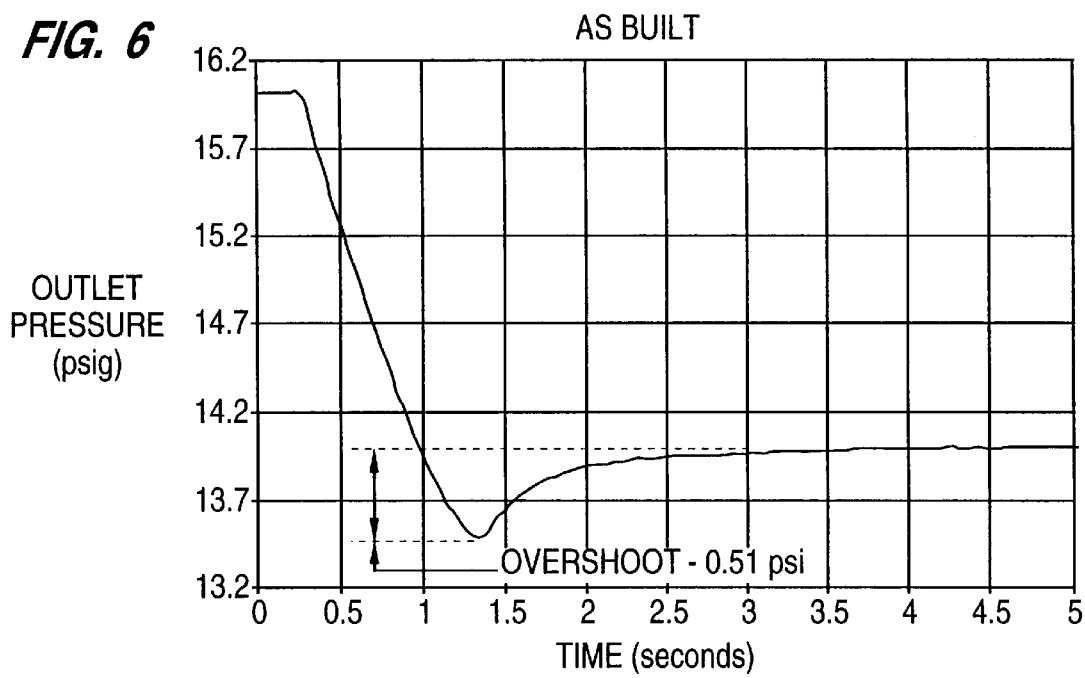
FIG. 6 is a transient response curve for the regulator of FIG. 5 of the invention as built.
Figure 7:
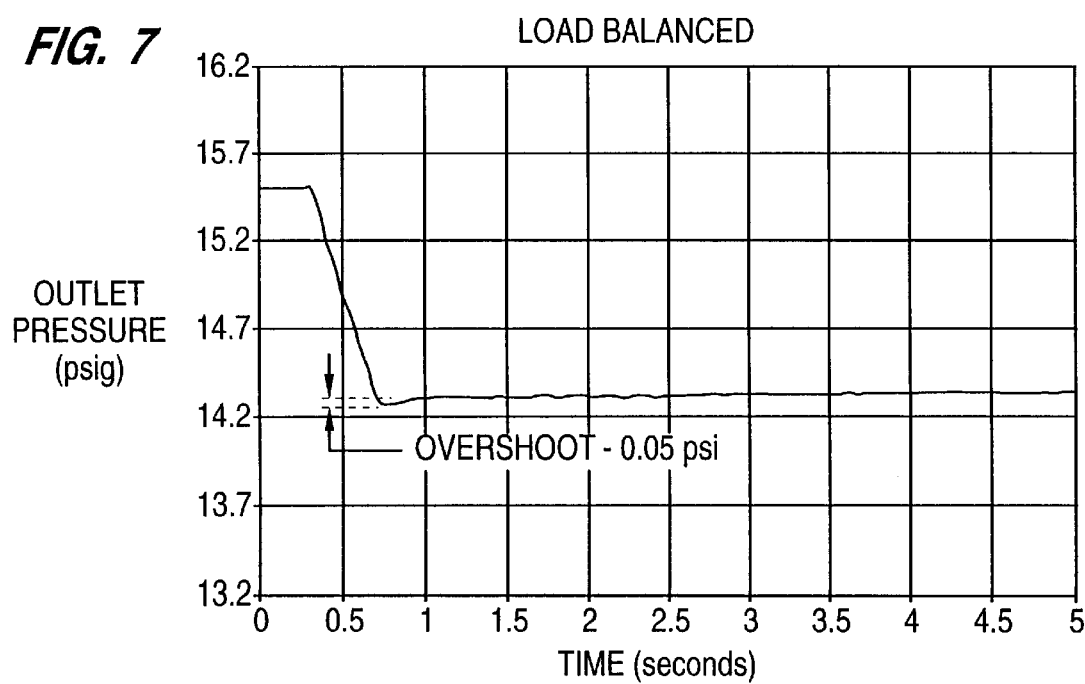
FIG. 7 is a transient response curve for the regulator of FIG. 5 of the invention after balancing the lateral loads of the poppet against the valve seat according to the method of the invention.

It has been found that by balancing the lateral loads of the poppet against the seat, the overshoot of outlet pressure of a regulator can be reduced by a factor of ten. This is shown on the transient response curves of FIGS. 6 and 7. FIG. 6 depicts the transient response curve for the regulator as built. The magnitude of the overshoot is 0.51 psi and the time duration thereof is several seconds. Once load balanced according to the invention, the overshoot is reduced to 0.05 psi with the length of time of the overshoot being less than 1 second in duration. As explained above, this improvement in consistency in the gas flow without producing spikes therein enhances the semiconductor fabrication process and leads to more consistent results in the application of materials or elements from the gas to the wafer.

Figure 8:
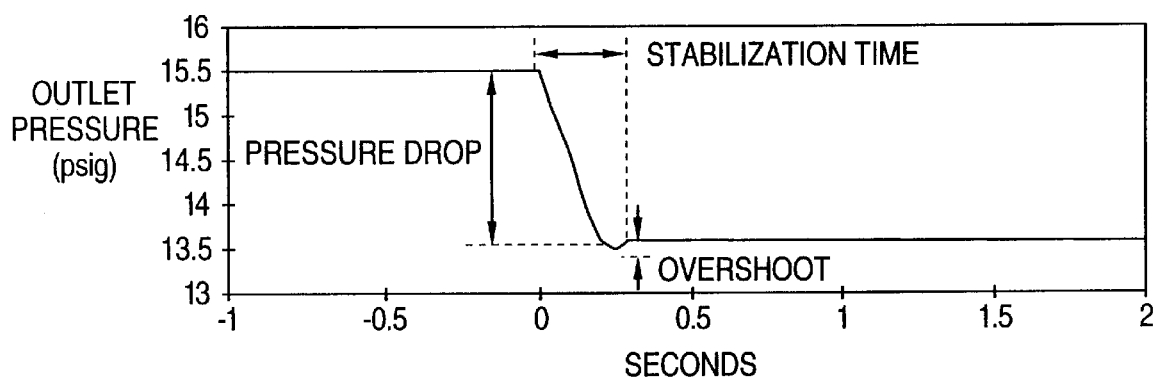
FIG. 8 is a transient response curve of a regulator of the invention after the onset of flow under specified conditions.

A performance specification for the transient response of the load balanced pressure regulator according to the invention wherein the inlet pressure to the regulator is 30 psig and the outlet pressure 15 psig with $N^2$ being gas regulated, is that the outlet pressure transient response as flow goes from 0 cc/min to 250 cc/min shows a pressure drop of 2.00 psig maximum, a stabilization time of 1.00 second maximum and an overshoot of 0.10 psig maximum. This is graphically depicted in FIG. 8 of the application drawings.

An apparatus 27 of the invention employing the regulator 1 is shown in FIG. 5. The apparatus includes a supply 28 of pressurized gas for manufacturing semiconductor devices and a flow line 29 connecting the supply to a semiconductor manufacturing device 30. The regulator 1 is provided in the flowline 29 upstream of a mass flow controller 31. Values 32 and 33 are located immediately upstream and downstream of the regulator 1 along the flowline to open and close the flowline.

While I have shown and described only one embodiment in accordance with the present invention, it is understood that the same is not limited thereto but is susceptible to changes and modifications known to those skilled in the art. Therefore, I do not wish to be limited to the details shown and described herein, but intend to cover all such changes and modifications as are encompassed by the scope of the appended claims.

I claim:

1. A gas pressure regulator comprising an inlet, an outlet, a gas passage extending through the regulator between said inlet and said outlet for the flow of pressurized gas through said regulator, a valve seat and a valve arranged for opening and closing said gas passage, a poppet carrying one of said valve seat and said valve and being movable along an axis thereof for effecting relative movement between said valve and said valve seat for opening and closing said gas passage, a diaphragm mounted in said regulator for movement, said poppet being connected to said diaphragm for movement therewith along said axis, means for applying an adjustable force to said diaphragm and poppet for setting a desired outlet gas pressure of said regulator in accordance with the balance of forces thereon including force from said means for applying, and means for reducing the overshoot of the outlet gas pressure of the regulator with respect to a set outlet pressure at the onset of flow through the regulator, said means for reducing being externally adjustable with the regulator in a functional mode.

2. The regulator according to claim 1, wherein said means for applying an adjustable force to said diaphragm and poppet applies a force asymmetrically with respect to said axis of said poppet, and wherein said means for reducing the overshoot includes a tool for externally adjusting the asymmetry of said adjustable force applied to said diaphragm and poppet by said means for applying with the regulator in a afunctional mode.

3. The regulator according to claim 2, wherein said means for applying an asymmetrical force to said diaphragm and poppet comprises an asymmetric compression spring.

4. The regulator according to claim 3, wherein an end of said compression spring adjacent said diaphragm is non-normal relative to a central axis of said spring such that said spring acts as a cam which provides a load on said diaphragm and poppet offset from said central axis of the spring and said axis of said poppet.

5. The regulator according to claim 4, wherein said tool for externally adjusting the asymmetry of the adjustable force applied to said diaphragm and valve rotates said spring about said central axis thereof with the regulator in a functional mode.

6. The regulator according to claim 5, further comprising means for preventing rotation of said spring about said axis thereof in the absence of actuation of said tool.

7. The regulator according to claim 6, wherein said means for preventing rotation includes a magnetic washer securing said compression spring against rotation in the absence of actuation of said tool.

8. A gas pressure regulator comprising an inlet, an outlet, a gas passage extending through the regulator between said inlet and said outlet for the flow of pressurized gas through said regulator, a valve seat and a valve arranged for opening and closing said gas passage, a poppet carrying one of said valve seat and said valve and being movable along an axis thereof for effecting relative movement between said valve and said valve seat for opening and closing said gas passage, a diaphragm mounted in said regulator for movement, said poppet being connected to said diaphragm for movement therewith along said axis, means for applying an adjustable force to said diaphragm and poppet for setting a desired outlet gas pressure of said regulator in accordance with the balance of forces thereon including force from said pressurized gas and the adjustable force from said means for applying, and means for reducing the time of the transient response of the regulator at the onset of flow through the regulator, said means for reducing being externally adjustable with the regulator in a functional mode.

9. The regulator according to claim 8, wherein said means for applying an adjustable force to said diaphragm and poppet applies a force asymmetrically with respect to said axis of said poppet, and wherein said means for reducing the time of said transient response includes a tool for externally adjusting the asymmetry of said adjustable force applied to said diaphragm and poppet by said means for applying with the regulator in a functional mode.

10. The regulator according to claim 9, wherein said means for applying an asymmetrical force to said diaphragm and poppet comprises an asymmetric compression spring.

11. The regulator according to claim 10, wherein an end of said compression spring adjacent said diaphragm is non-normal relative to a central axis of said spring such that said spring acts as a cam which provides a load on said diaphragm and poppet offset from said axis of said spring and said axis of said poppet.

12. The regulator according to claim 11, wherein said mechanism for adjusting the asymmetry of the adjustable force applied to said diaphragm and valve includes an externally accessible tool for rotating said spring about said central axis thereof with the regulator in a functional mode.

13. The regulator according to claim 12, further comprising means for preventing rotation of said spring about said axis thereof in the absence of actuation of 10 said tool.

14. The regulator according to claim 13, wherein said means for preventing rotation includes a magnetic washer for securing a set rotational position of said spring in said regulator in the absence of actuation of 15 said tool.

15. A gas pressure regulator comprising an inlet, an outlet, a gas passage extending through the regulator between said inlet and said outlet for the flow of pressurized gas through said regulator, a valve seat and a valve arranged for opening and closing said gas passage, a poppet carrying one of said valve seat and said valve and being movable along an axis thereof for effecting relative movement between said valve and said valve seat for opening and closing said gas passage, a diaphragm mounted in said regulator for movement, said poppet being connected to said diaphragm for movement therewith along said axis, a compression spring and a mechanism for adjustably compressing said spring for applying an adjustable force to said diaphragm and poppet for setting a desired outlet gas pressure of said regulator in accordance with the balance of forces thereon including force from said pressurized gas and the adjustable force from said compression spring, said compression spring being arranged for applying said adjustable force to said diaphragm and poppet asymmetrically with respect to said axis of the poppet, and an externally accessible adjustment member for adjusting the asymmetry of said adjustable force applied by said compression with the regulator in a functional mode.

16. An apparatus for delivering a process gas for the manufacture of semiconductor devices, said apparatus comprising a source of a pressurized process gas for the manufacture of semiconductor devices, a flowline from said source for delivering said process gas for the manufacture of semiconductor devices, and a gas pressure regulator in said flowline for regulating the pressure of said pressurized gas being delivered by said apparatus, wherein said gas pressure regulator comprises an inlet, an outlet, a gas passage extending through the regulator between said inlet and said outlet for the flow of pressurized gas through said regulator, a valve seat and a valve arranged for opening and closing said gas passage, a poppet carrying one of said valve and said valve seat and being movable along an axis thereof for effecting relative movement between said valve and said valve seat for opening and closing said gas passage, a diaphragm mounted in said regulator for movement, said poppet being connected to said diaphragm for movement therewith along said axis, means for applying an adjustable force to said diaphragm and poppet for setting a desired outlet gas pressure of said regulator in accordance with the balance of forces thereon including force from said pressurized gas and the adjustable force from said means for applying, and means for reducing the overshoot of the outlet gas pressure of the regulator with respect to a set outlet pressure at the onset of flow through the regulator, said means for reducing being externally adjustable with the regulator in a functional mode.

17. A method of improving the performance of a tied diaphragm gas pressure regulator having a gas passage therethrough, a valve and a valve seat arranged for opening and closing said gas passage, a poppet carrying one of said valve seat and said valve and being movable along an axis thereof for effecting relative movement between said valve and said valve seat for opening and closing said gas passage, and a diaphragm mounted in said regulator for movement, said poppet being connected to said diaphragm for movement therewith along said axis, said method comprising applying force to said diaphragm and said poppet which is asymmetrical with respect to said axis of said poppet, and adjusting the asymmetry of said force while said regulator is in a functional mode to reduce lateral force between said valve and said valve seat when said gas passage is closed by said valve and said valve seat.

* * * * *